US012802101B2

(12) United States Patent
Muthu et al.

(10) Patent No.: US 12,802,101 B2
(45) Date of Patent: Nov. 17, 2026

(54) ARTIFICIAL INTELLIGENCE SYSTEMS FOR AUTOMATED SOCIAL MEDIA CONTENT GENERATION AND TREND INTEGRATION

(71) Applicant: Intuit, Inc., Mountain View, CA (US)

(72) Inventors: Malathy Muthu, The Woodlands, TX (US); Roger C. Meike, Redwood City, CA (US); Alexis Kim Tymofiev, Santa Clara, CA (US); Andrew Holmes, Denton, TX (US); Courtney M. Ferguson, Greenville, NC (US); Hannah Anokye, San Francisco, CA (US); Shaozhuo Jia, Mountain View, CA (US); Mohsin Akhtar Malik, Buffalo, NY (US); Ryan Rich, Oceanside, CA (US); Xianzhi Hu, South San Francisco, CA (US)

(73) Assignee: Intuit Inc., Mountain View, CA (US)

(*) Notice: Subject to any disclaimer, the term of this patent is extended or adjusted under 35 U.S.C. 154(b) by 230 days.

(21) Appl. No.: 18/664,256

(22) Filed: May 14, 2024

(65) Prior Publication Data

US 2025/0356435 A1 Nov. 20, 2025

(51) Int. Cl.
*G06Q 50/00* (2024.01)
*G06F 16/957* (2019.01)
(Continued)

(52) U.S. Cl.
CPC ....... *G06Q 30/0269* (2013.01); *G06F 16/957* (2019.01); *G06Q 10/44* (2026.01)

(58) Field of Classification Search
None
See application file for complete search history.

(56) References Cited

U.S. PATENT DOCUMENTS

2016/0379251 A1* 12/2016 Sanjay ............... G06Q 30/0255 705/14.58
2019/0014390 A1* 1/2019 Holtz .................. H04N 21/812
(Continued)

FOREIGN PATENT DOCUMENTS

KR 20230031750 A * 3/2023 ............ G06N 20/00

OTHER PUBLICATIONS

Shah, N., Engineer, S., Bhagat, N. et al., Research Trends on the Usage of Machine Learning and Artificial Intelligence in Advertising, Nov. 25, 2020, Augmented Human Research, vol. 5, Article 19 (Year: 2020).*

*Primary Examiner* — Christopher Gomez
(74) *Attorney, Agent, or Firm* — Dinsmore & Shohl LLP

(57) ABSTRACT

Certain aspects of the disclosure provide artificial intelligence (AI) methods and systems for generating personalized social media content with trend integration. A method generally includes retrieving data from data sources that includes customer interactions with a business, and inventory data of the business, determining trending-product pairs that increase engagement of the customers with products recorded in the inventory data of the business based on the retrieved data. A generative artificial intelligence (AI) model is used to generate one or more of a caption, a hashtag, and a promotional image that are personalized to each of the customers in response to receiving prompts that contain information about the customers, information about trending-product pairs, and social media platforms of the customers. The method sends one or more of the captions, the hashtags, and the promotional images that are personalized to the customers to social media platforms of the customers.

19 Claims, 14 Drawing Sheets

(51) Int. Cl.

| | |
|---|---|
| ***G06Q 10/44*** | (2026.01) |
| ***G06Q 30/0251*** | (2023.01) |

(56) References Cited

U.S. PATENT DOCUMENTS

| | | | | |
|---|---|---|---|---|
| 2019/0073697 | A1* | 3/2019 | Varley ................ | G06Q 30/0269 |
| 2021/0312502 | A1* | 10/2021 | Goodsitt ................ | G06N 20/00 |
| 2021/0342927 | A1* | 11/2021 | Morin ................ | G06Q 30/0269 |
| 2022/0277357 | A1* | 9/2022 | Rosenfeld .......... | G06Q 30/0277 |

* cited by examiner

902

904 906 908

| Trending content | Product description | Cosine similarity > $Th_{sim}$ |
|---|---|---|
| ⋮ | ⋮ | ⋮ |
| $TC_i$ | $PD_x$ | $\cos(\theta_{ix})$ |
| $TC_i$ | $PD_y$ | $\cos(\theta_{iy})$ |
| $TC_i$ | $PD_z$ | $\cos(\theta_{iz})$ |
| ⋮ | ⋮ | ⋮ |

ARTIFICIAL INTELLIGENCE SYSTEMS FOR AUTOMATED SOCIAL MEDIA CONTENT GENERATION AND TREND INTEGRATION

BACKGROUND

Field

Aspects of the present disclosure relate to machine learning, and in particular, to automated artificial intelligence-based methods and systems for generating social media content and trend integration.

Description of Related Art

Businesses often struggle to stay relevant and engage with consumers in the fast pace ever changing marketing of products to users of social media platforms, such as Instagram®, X, Pinterest®, and Facebook®. Interest in trending products typically follow a rapid rise in consumer interest that peaks and then fades away. Traditional methods of manually creating advertisements take time to design before the advertisements can be pushed to social media platforms. By the time a traditionally created advertisement is produced and pushed to consumers on social media, consumer interests in a trending product may have faded and consumers may already be looking at newly emerging trending products. Moreover, traditionally created advertisements are directed to a large audience and fail to personally engage with many users of social media platforms. As a result, businesses who invest in creating advertisements for trending products on social media platforms waste time and money creating content that is often ignored by consumers for lack of personal engagement or may be out of date by the time the advertisements reach customers on social media platforms.

Accordingly, improved, automated techniques for generating social media content to keep up with the fast pace of changing trends in products offered for sale by businesses are needed.

SUMMARY

Certain aspects provide a computer-implemented method for automated social media content generation and trend integration. The method retrieves data from various data sources. The data includes customer interactions with a business, a profile of the business, inventory data of the business, sales data of the business, and content from social media websites of customers of the business. The method determines trending-product pairs that increase engagement of the customers with products recorded in the inventory data of the business based on the retrieved data. A generative artificial intelligence (AI) model is used to generate one or more of a caption, a hashtag, and a promotional image that are personalized to each of the customers in response to receiving prompts that contain information about the customers, information about trending-product pairs, and social media platforms of the customers. The method sends one or more of the captions, the hashtags, and the promotional images that are personalized to the customers to social media platforms of the customers.

Another aspect provides a computer-implemented AI agent that generates social media content and performs trend integration. The AI engine includes a retrieve data engine to retrieve data from data sources. The data includes customer interactions with a business, a profile of the business, inventory data of the business, sales data of the business, and social media websites of customers of the business. The AI engine includes a trending-product pairs engine to generate trending-product pairs designed to increase engagement of the customers with products recorded in the inventory data of the business. The AI engine includes a generative artificial intelligence (AI) model engine to generate one or more of a caption, a hashtag, and a promotional image that are personalized to each of the customers in response to receiving prompts that contain information about the customers, information about trending-product pairs, and social media platforms of the customers. The AI engine includes a send engine to send one or more of the captions, the hashtags, and the promotional images that are personalized to the customers to social media platforms of the customers.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
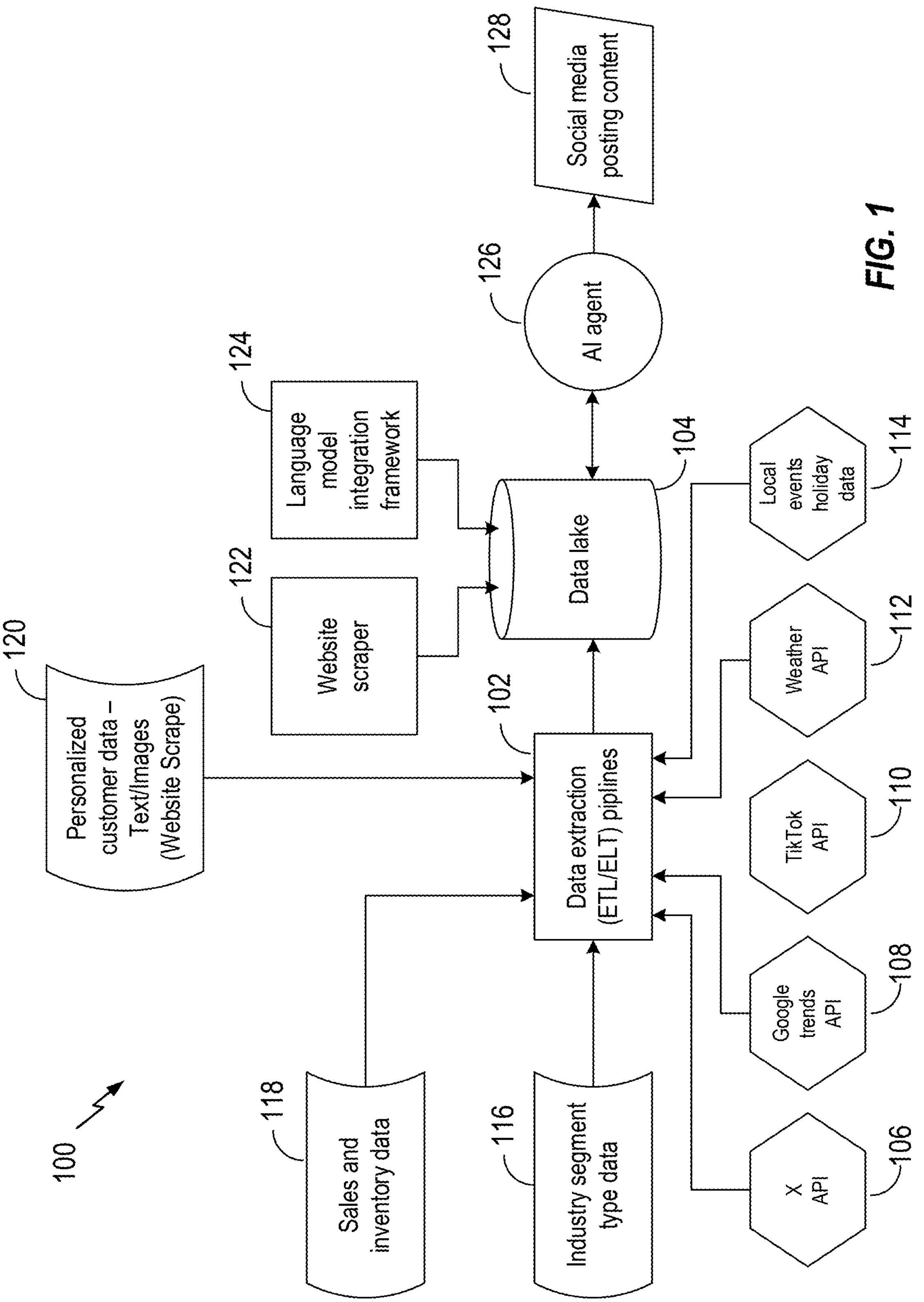
FIG. 1 depicts an example implementation of customer and business data retrieved from various data sources.

The traditional practice of manually creating advertisements for users of social media platforms are expensive and take time to design before the advertisements are ready to be pushed on to social media platforms. As a result, businesses that desire to compete in the fast pace market of trending products and rely on the traditional practices of manually created advertisements often fail to stay relevant and engage with social media users. By the time a traditionally created advertisement is produced and pushed to consumers on social media, consumer interests in a trending product may have faded. Traditionally created advertisements also lack a personal connection with consumers and fail to attract the attention of many consumers on social media platforms.

Embodiments described herein use automated AI models to rapidly identify trending products based on data retrieved from customer interactions with a business, a profile of the business, inventory data of the business, sales data of the business, and content of social media websites of customers of the business. The AI models include natural language processing (NLP) models that perform content filtering and summarization of the data based on relevance to the business's industry, target audience, and geographical location. Other AI models perform trend analysis and correlation to generate trending content and corresponding products that are of interest to consumers. A generative artificial intelligence (AI) model is used to generate one or more of a caption, a hashtag, and a promotional image that are personalized to each of the customers in response to receiving prompts that contain information about the customers, information about trending-product pairs, and social media platforms of the customers. The one or more of the captions, the hashtags, and the promotional images that are personalized to the customers are sent to social media platforms of the customers.

The combined use of the NLP models to perform content filtering, the AI models to preform trend analysis and correlation to generate pairs of trending content and products, and generative AI to generate personalized captions, hashtags, and product images that correspond to the trending content and product pairs is a unique and novel approach to solving the problem of timely creating personalized and relevant social media content in business advertising. The methods described herein are unique in the field of AI powered social media marketing and are entirely automated and adaptive to the rapidly changing trends in products advertised on social media platforms.

Social media management platforms have been developed to try and detect trending products. For example, some social media management platforms have been developed to enable businesses to schedule posts, monitor social media conversations, and track performance. However, these platforms lack an AI-driven trend analysis and personalized content generation capabilities of the methods and systems described herein.

Other social media management tools have been developed to enable scheduling and analytics of trending topics. But these tools do not provide AI-driven trend integration and automated content creation of the methods and systems described herein.

Still other social media management tools provide social media management, analytics, and customer service features. While these tools offer some level of trend tracking, these tools are not capable of automatically correlating identified trends with the inventory of a business and generate personalized content.

Example Implementation of an Artificial Intelligence Method for Automated Social Media Content Generation and Trend Integration FIG. 1 depicts an example implementation 100 of retrieving customer and business data from various data sources. Block 102 represents pipelines that are used to move data retrieved from various data sources into a data lake 104 for a customer of a business. The pipelines 120 can be ELT (extract, load, and transform) and ETL (extract, transform, and load) pipelines. ETL pipelines transform the retrieved data prior to loading the data in the data lake 104. The transform prepare the data for analysis, such as removing duplicates and filling in missing values. ELT pipelines transform the retrieved data after the data has been loaded into the data lake 104. The data lake 104 is a single storage location of data associated with a customer. The various data sources include social media application programming interfaces (APIs) that retrieve data from social media websites, such as X (Twitter) API 106, Google Trends API 108, TikTok API 110, Weather API 112, and local events API 114, pass the data to the pipelines 102. The various data sources include industry segment data 116, such as data associated with the industry of the business, sales and inventory data 118 of the business, and personalized data of the customer 120, such as text and images, scraped from websites. Block 122 represents a website scraper that scrapes publically available data from social media websites, such as websites with customer reviews. Block 124 represents a language model integration framework, such as LangChain MapReduce, that summarizes large collections of customer and business data recorded in the data lake 104.

An artificial intelligence (AI) agent 126 uses the data in the data lake 104 to train and use large language models (LLMs), natural language processing (NLP) models, and AI models as described below to rapidly identify trending products, create trending-product pairs, and generate personalized content 128, such as captions, hashtags, and promotional images, that are sent to social media platforms of the customers. Each caption, hashtag, and promotional image is personalized to the customer. In certain implementations, the personalized captions, hashtags, and promotional images may include links that when launched via the social media platform display an advertisement for the product.

Figure 2:
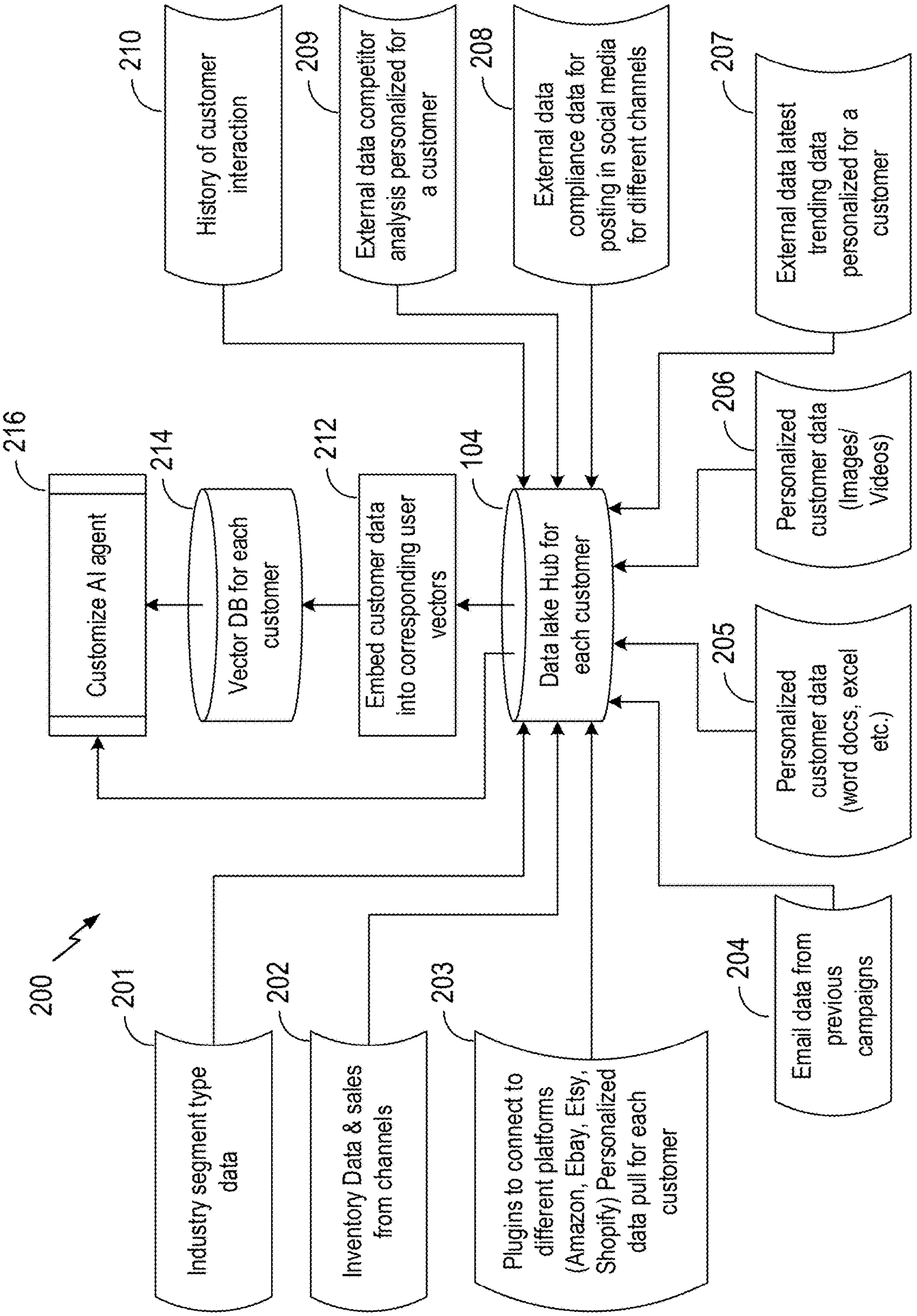
FIG. 2 depicts an example of types of data stored in a data lake.

FIG. 2 depicts example types of data stored in the data lake 104. The data is used to create personalized content on social media platforms of customers. The data lake 104 stores various types of data 201-210 associated with the business and each customer that has been retrieved from the various sources described above with reference to FIG. 1. Block 212 represents embedding the various types of data associated with each customer and the business into a corresponding user vector that is in turn stored in a vector database 214. Block 216 represents the process of customizing an AI agent to create personalized content on a social media platform of each customer of the business, as described below with reference to FIG. 3, based on the various types of customer data 201-210 associated with the customer and on the user vector associated with the customer.

Figure 3:
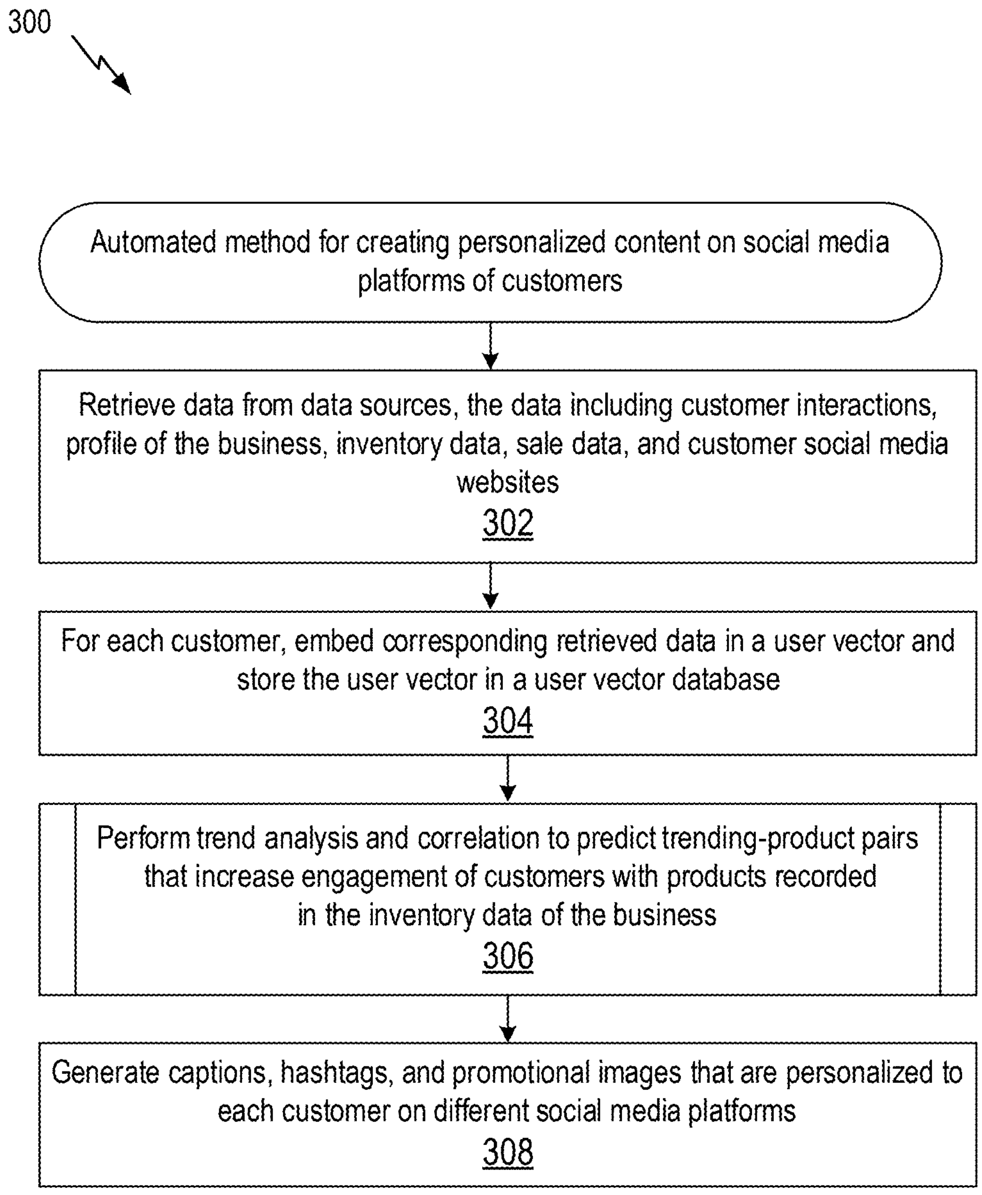
FIG. 3 is a flow diagram of an example automated method for creating personalized content on social media platforms of customers.

FIG. 3 is a flow diagram 300 of an example automated method for creating personalized content on social media platforms of customers. In block 302, data is retrieved from various data sources as described above with reference to FIG. 1. The data includes customer interactions, profile of the business, inventory data of the business, sales data, and data scraped from social media websites. In block 304, the retrieved data for each customer and the business is embedded in a corresponding user vector and stored in the user vector database as described below with reference to FIG. 4. In block 306, a "perform trend analysis and correlation to predict trending-product pairs that increase engagement of customers with products recorded in the inventory data of the business" procedure is executed. An example implementation of the "perform trend analysis and correlation to predict trending-product pairs that increase engagement of customers with products recorded in the inventory data of the business" process is described below with reference to FIG. 5. In block 308, captions, hashtags, and promotional images that are personalized to each customer on different social media platforms are generated as described below with reference to FIG. 11.

Figure 4:
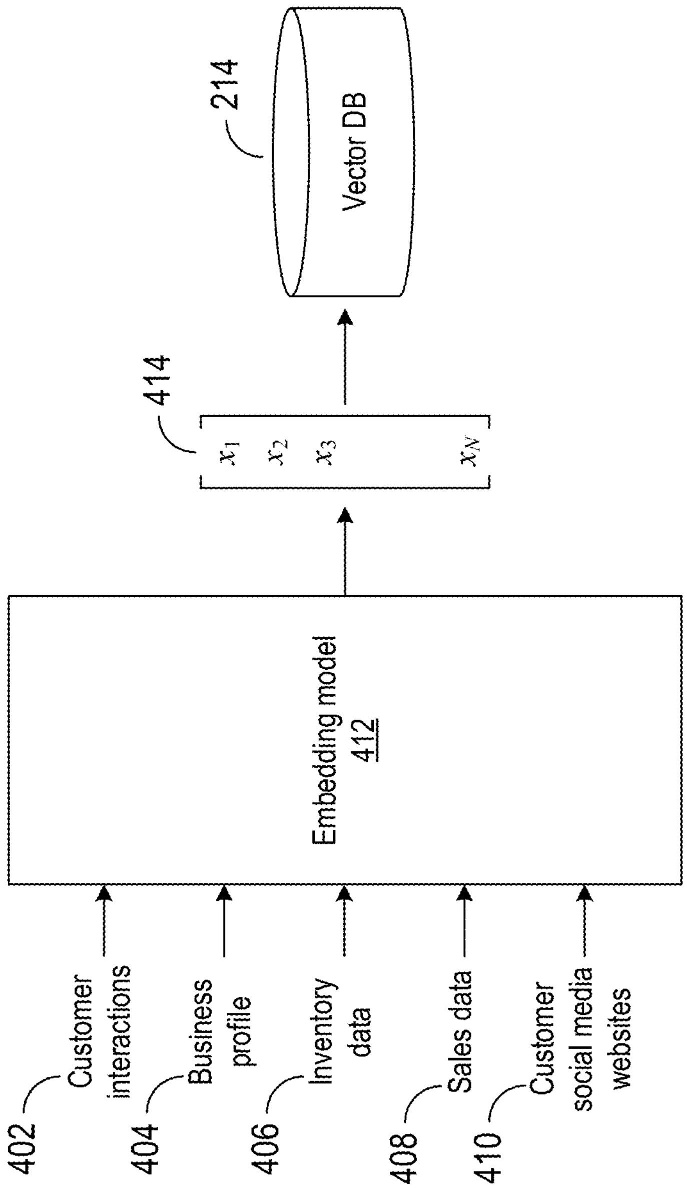
FIG. 4 depicts an example of embedding data for a customer and a business into a corresponding user vector.

FIG. 4 depicts an example of embedding the data of a customer and the business into a corresponding user vector. In this example, customer interactions 402 with the business are composed of the textual data obtained from the social media APIs shown in FIG. 1. Business profile 404 is composed of the textual data that describes the types of products sold by the business, customers, goals, and general information about the business. Inventory data 406 contains textual data that describes the types of products the business has in inventory. Sales data 408 contains textual data that describes the products the business sells. Customer social media website data 410 is composed of the textual data scraped from social media websites of the customer. For example, social media website data may contain the text of product reviews posted online by the customer.

Block 412 represents an embedding model that receives as input the customer interactions 402, business profile 404, inventory data 406, sales data 408, and customer social media website data 410 and outputs a user vector 414 representation of the customer and the customer's business. For example, in one implementation, the embedding model 412 can be an open AI embedding model that converts chunks of textual data into numerical vectors. In another implementation, the embedding model 412 can be the model Word2vec model, which converts textual data to numerical vectors. The resulting user vector 414 contains numerical entries denoted by $x_i$, where i=1, . . . , N, and represents a point in an N-dimensional space. The user vector 414 is stored in the vector database 214.

Figure 5:
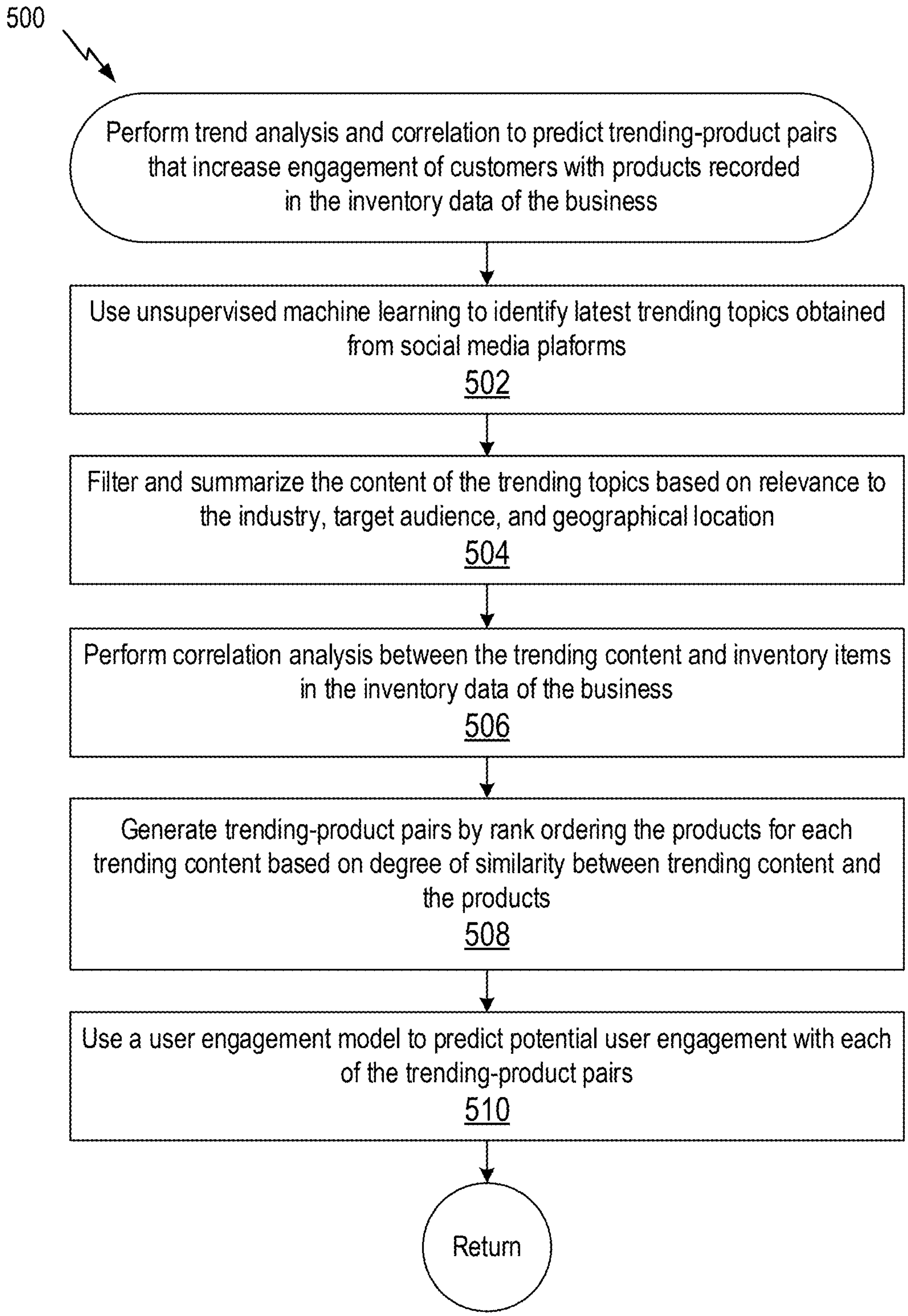
FIG. 5 is a flow diagram of a "perform trend analysis and correlation to predict trending-product pairs that increase engagement of customers with products recorded in the inventory data of the business" procedure executed in FIG. 3.

FIG. 5 is a flow diagram of the "perform trend analysis and correlation to predict trending-product pairs that increase engagement of customers with products recorded in the inventory data of the business" procedure executed in block 306 of FIG. 3. In block 502, an unsupervised machine learning method, described below with reference to FIG. 6, is used to identify the latest trending topics in the social media obtained with the APIs of the social media platforms described above with reference to FIG. 1.

Figure 6:
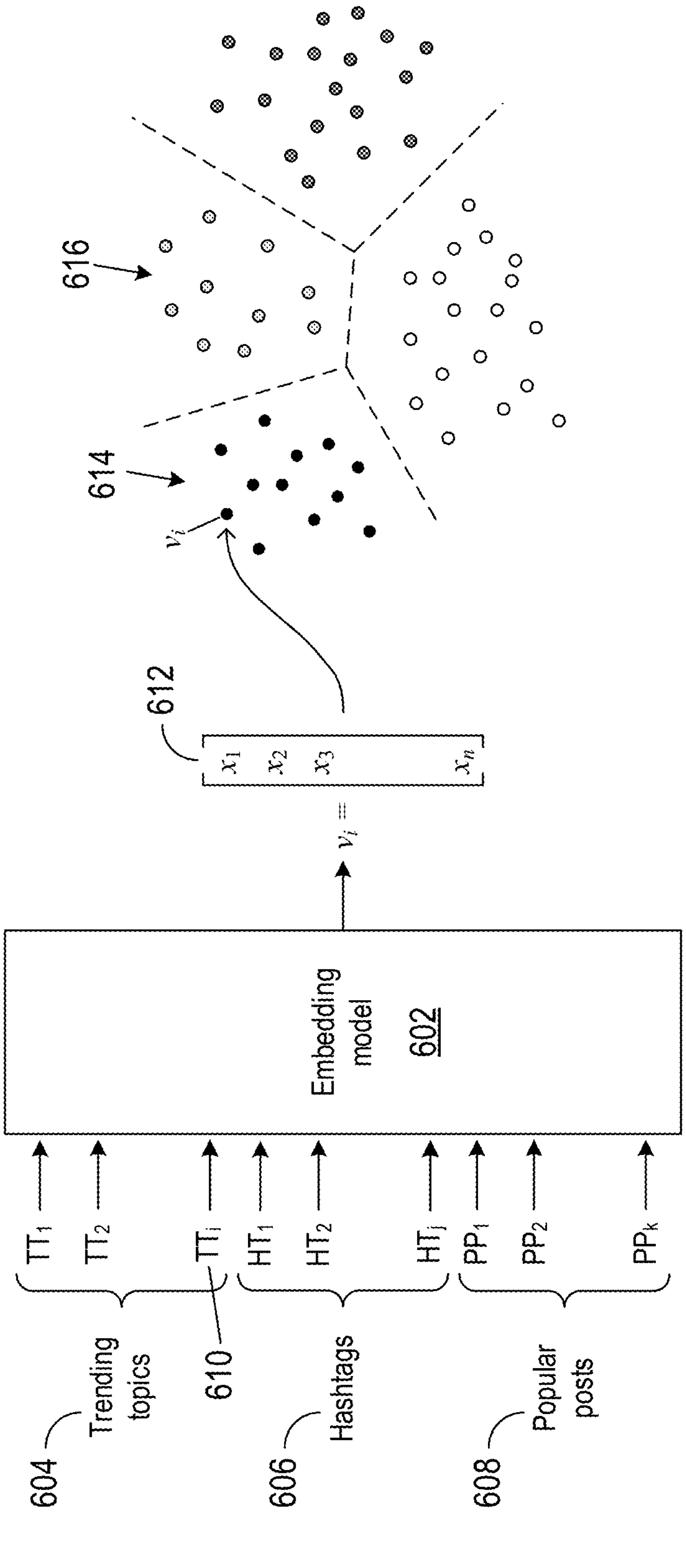
FIG. 6 depicts an example of performing trend analysis and correlation to identify the latest trending topics, hashtags, and popular posts on social media platforms.

FIG. 6 depicts an example of performing trend analysis and correlation to identify the latest trending topics, hashtags, and popular posts on social media platforms. Block 602 represents an embedding model, such as BERT, Word2vec, or an open AI embedding model. The textual data of the trending topics 604 are denoted by $TT_1, \ldots, TT_i$, where i is the number of trending topics. The textual data of trending hashtags 606 are denoted by $HT_1, \ldots, HT_j$, where j is the number of trending topics. The textual data of popular posts 608 are denoted by $PP_1, \ldots, PP_k$, where k is the number of trending topics. The textual data of the trending topics, hashtags, and popular posts are input separately to the embedding model 602, which outputs corresponding vectors in an n-dimensional space. Clusters of the vectors correspond to trending events. For example, in FIG. 6, in response to receiving textual data of the trending topic $TT_i$ 610 as input, the embedding model 602 outputs a corresponding n-dimensional vector $v_i$. The vector $v_i$ corresponds to a point in the n-dimensional space. Because dimensions higher than two-dimensions cannot be visualized, for the sake simplicity, in FIG. 6, and in other figures described below, vectors in the n-dimensional space are depicted as points in two dimensions. For example, the point 614 represents the vector $v_i$ 612, which, in turn, represents the trending topic $TT_i$ 610. A clustering technique, such as K-means clustering or K-means++ clustering, is used to partition the vectors into clusters of similar vectors as shown in FIG. 6 with different point shadings separated by dashed lines. Each cluster of points in the n-dimensional space corresponds to different trending content expressed in the textual data of the trending topics, hashtags, and popular posts. Black points, such as point 614, form a cluster in n-dimensional space and correspond to trending topics, hashtags, and popular posts that have been extracted from social media platforms and describe a first type trending content that is trending on social media. Gray points, such as gray point 616, form a second cluster of points in n-dimensional space that corresponds to trending topics, hashtags, and popular posts extracted from social media platforms and describe a second trending content that is trending on social media. The trending content associated with each cluster contains textual data that describes particular types of products that are currently trending. For example, the trending contend in the trending posts, hashtags, and popular posts represented by the cluster of points 614 comprises textual data that describes a particular style and brand of shoes or describes how people feel about the particular style and brand of shoes.

Returning to FIG. 5, in block 504, the trending content of the trending topics, hashtags, and popular posts of each cluster are filtered and summarized based on relevance to the business' industry, the business' target audience, and business' geographical location. Filtering is performed using a natural language processing (NLP) model and machine learning classification techniques to obtain the content of the trending subject matter. After filtering to obtain the content, the content is summarized using a transformer model, such as Seq2Seq.

Figure 7:
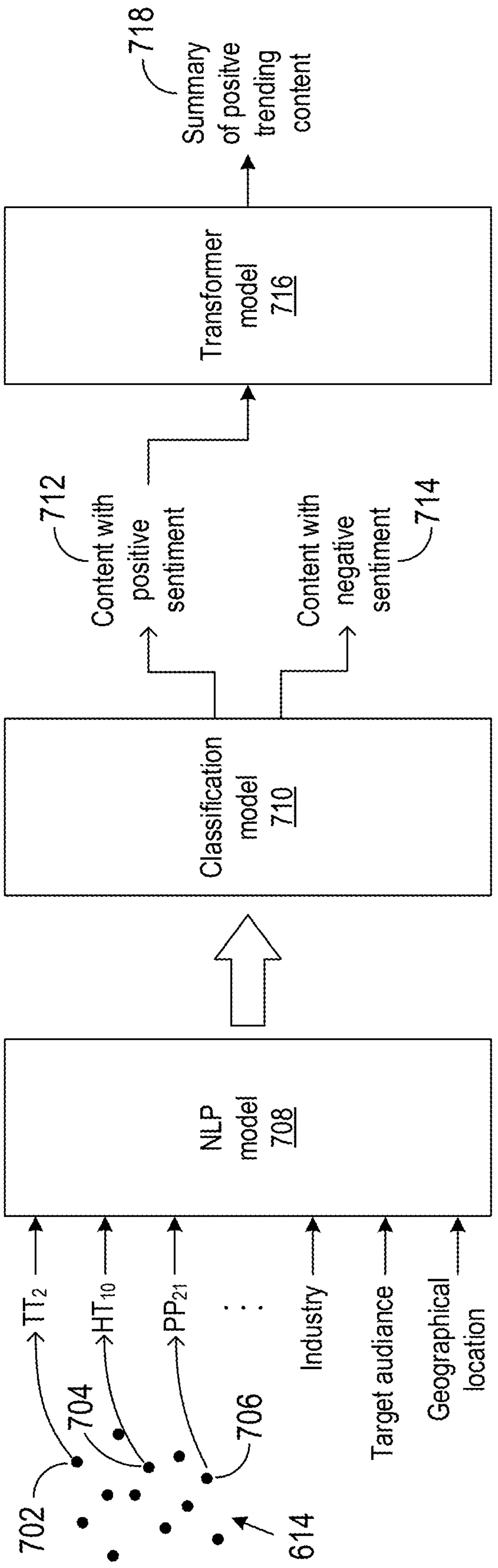
FIG. 7 depicts an example of performing filtering and summarizing content in the trending subject matter.

FIG. 7 depicts an example of performing filtering and summarizing the content in the trending subject matter based on relevance to the industry, target audience, and geographical location of the business. The trending topics, hashtags, and popular post represented by each of the clusters in FIG. 6 and the business' industry, target audience, and geographical location are input to the NLP model 708. For example, in FIG. 7 the textual data of the trending topics, hashtags, and popular post represented by the cluster of points 614 in FIG. 6 and the business' industry, target audience, and geographical location are input to the NLP model 708. The NLP model 708 outputs the sentiment of the text in the trending subject matter trending topics, hashtags, and popular post with respect to business' industry, target audience and geographical location. The sentiment can be positive or negative. Block 710 represents a classification model. The classification model 710 can be a support vector machine (SVM) or a Naïve Bayes classifier (NBC) that classifies the text output from the NLP model 708 based on the sentiment expressed in the content of the text output from the NLP model 708. The classification model 710 receives as input the text output from the NLP model 708 and classifies the content of the text as expressing a positive sentiment 712 or expressing a negative sentiment 714. Block 716 represents a transformer model that receives as input the content and sentiment 712 of the text and outputs a summary of the positive trending content contained in the text of trending topics, hashtags, and popular post using extractive and abstractive summarization techniques. The transformer model 710 can be a general-purpose NLP encoder-decoder, such as the Seq2Seq machine learning model trained for text summarization.

Returning to FIG. 5, in block 506, correlation analysis is performed on the trending content of the trending topics, hashtags, and popular posts output from the transformer model 716 in FIG. 7 and the products in the inventory data of the business. The correlation analysis identifies correlated trending content and products of the business as described below with reference to FIG. 8.

Figure 8:
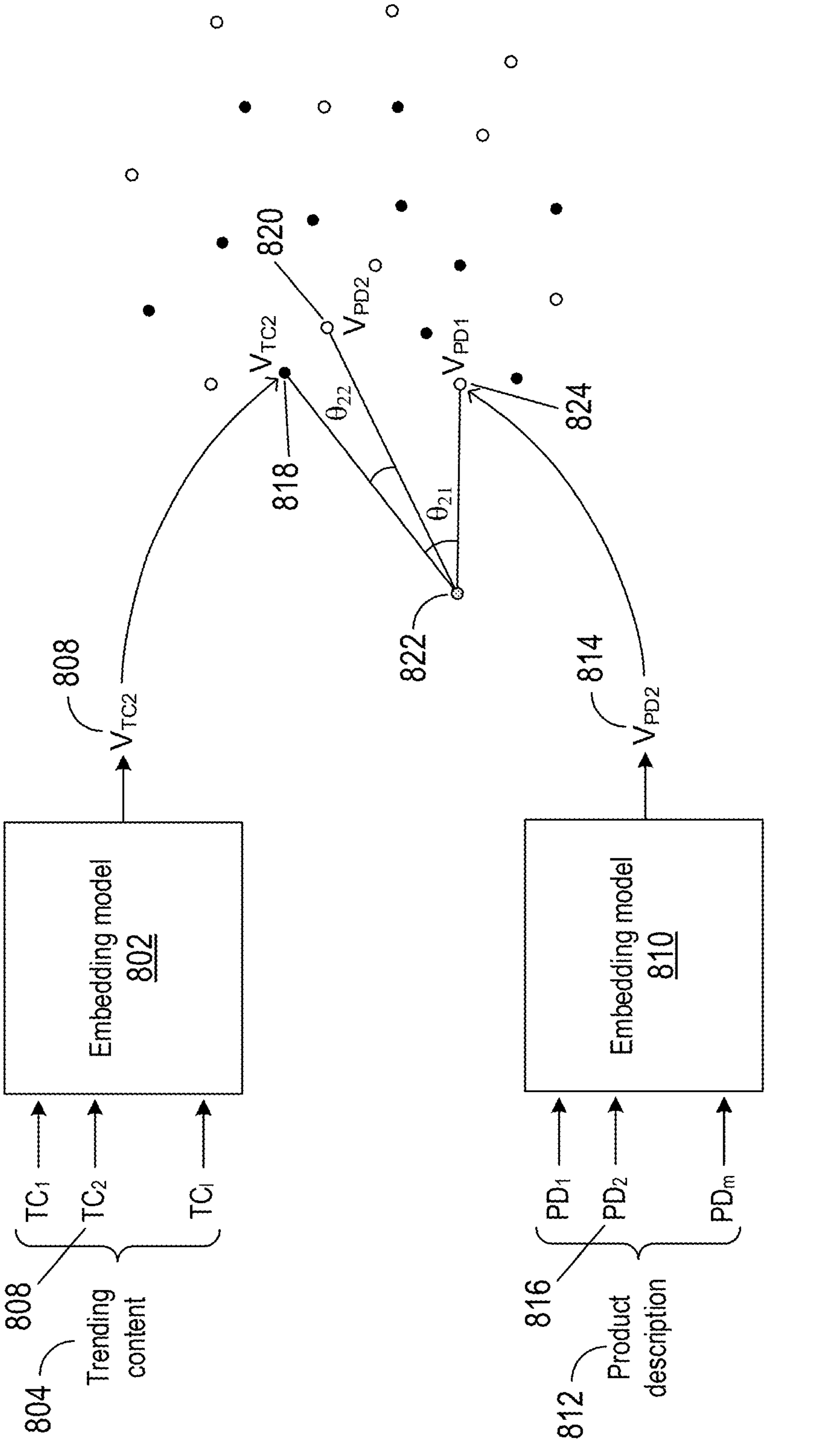
FIG. 8 depicts an example of identifying correlated trending content and products in inventory data.

FIG. 8 depicts an example of identifying correlated trending content and products in the inventory data of the business. Block 802 represents an embedding model that receives as input trending content 804 of a cluster of the trending topics, hashtags, and popular posts. The trending content are denoted by $TC_1, \ldots, TC_l$, where l is the number of different types of trending content identified in the trending topics, hashtags, and popular posts. The embedding model 802 generates a separate n-dimensional vector for each type of trending content. For example, the embedding model 802 generates an n-dimensional trending content vector $V_{TC2}$ 806 for the trending content $TC_2$ 808. Block 810 represents an embedding model that receives as input product descriptions 812 of the products in the inventory data of the business. The product descriptions are denoted by $PD_1, \ldots, PD_m$, where m is the number of different products in the inventory data. The embedding model 810 generates a separate n-dimensional vector for each product description. For example, the embedding model 810 generates an n-dimensional vector $V_{PD2}$ 814 for the product description $PD_2$ 816. In FIG. 8, the n-dimensional trending content vectors are represented by solid points and product vectors are represented by open points. For example, solid point 818 represents trending content vector $V_{TC2}$ and open point 820 represents a product vector $V_{PD2}$. The cosine similarity is calculated for each pair of trending content and product vectors as follows:

$$\cos(\theta_{ij}) = \frac{V_{TCi} \cdot V_{PDj}}{\|V_{TCi}\| \|V_{PDj}\|} \quad (1)$$

where

-continued

"·" denotes the scalar product; and $\|\cdot\|$ denotes the norm of a vector.

The cosine similarity ranges between −1 and 1 and measures the degree of similarity between two vectors in an n-dimensional space. In FIG. 8, shaded point 822 represents the origin of the n-dimensional space. The cosine similarity between the trending content vector $V_{TC2}$ 818 and the product vector $V_{PD2}$ is larger than the cosine similarity between the trending content vector $V_{TC2}$ 818 and the product vector $V_{PD1}$ 824 (i.e., $\theta_{22}<\theta_{21}$). The closer the cosine similarity of the vectors $V_{TCi}$ and $V_{PDj}$ is to "1" (i.e., $\theta_{ij}$ is to zero), the more similar the text of the trending content $TC_i$ is to the text of the product description $PD_j$. The farther away the cosine similarity is away from "1" (i.e., $\theta_{ij}>0$), the more dissimilar the text of the trending content $TC_i$ is to the text of the product description $PD_j$. A similarity threshold $Th_{sim}$ can be used to identify correlated trending contents and product descriptions, which are called trending-product pairs. For example, $Th_{sim}$ can be set to 0.5, 0.7, or 0.9 or any suitable value for identifying correlated trending contents and product descriptions. The textual data of trending content $TC_i$ and the textual data of a product description $PD_j$ are correlated if the cosine similarity between the corresponding trending content vector $V_{TCi}$ and product vector $V_{PDj}$ satisfy the condition $\cos(\theta_{ij})>Th_{sim}$.

Returning to FIG. 5, in block 508, trending-product pairs are determined by rank ordering the product description for each type of trending content according the cosine similarity. The trending-product pair with the largest cosine similarity is the highest-ranked product for the trending content and forms the trending-product pair as described below with reference to FIGS. 9A-9C.

Figures 9A, 9B:
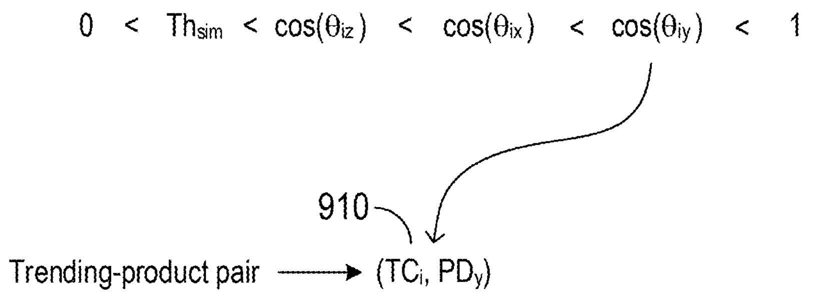
FIGS. 9A-9C depict an example of determining a trending-product pair.
Figure 9C:
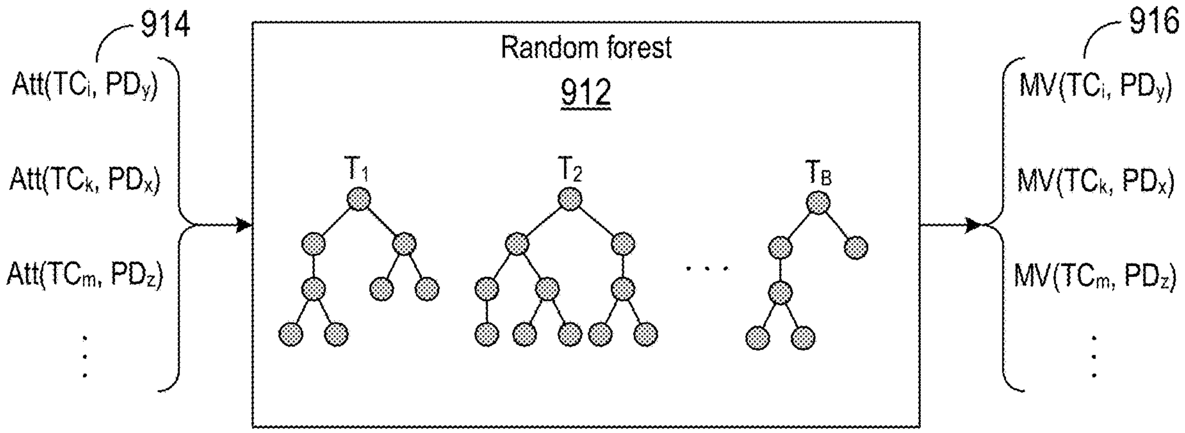

FIGS. 9A-9C depict an example of determining a trending-product pair by identifying the highest-ranked products in the business inventory data for each correlated trending content. FIG. 9A displays a table 902 of trending content in column 904, product descriptions in column 906, and cosine similarities that are greater than the similarity threshold in column 908. The trending content and product descriptions in the same row are correlated. In this example, trending content denoted by $TC_i$ is correlated with product descriptions denoted by $PD_x$, $PD_y$, and $PD_z$. In FIG. 9B, the cosine similarities are rank order from largest to smallest. In this example, trending content $TC_i$ and product $PD_y$ have the largest corresponding cosine similarity of the correlated trending content and the product descriptions. As a result, trending content $TC_i$ and product $PD_y$ form a trending-product pair 910.

A random forest can be trained on a training set of previously recorded trending-product pairs and a successful sales metric. The successful sales metric can be a customer engagement metric, number of increased sales, or probability of sales associated with each trending-product pair. The random forests is trained using the technique of bootstrap aggregating. The technique of bootstrap aggregating repeatedly selects with replacement a random sample of attributes of the trending-product pairs and corresponding successful sales metric values from the training set to fit a decision tree to the sample. The attributes include features associated with the product and the trend. For example, attributes of the product can be price, category, and historical sales data. Examples of attributes of the trend can be social media engagement metrics, such as likes, shares, and comments, and timing or seasonal factors. The process of random sampling with replace is repeated B times resulting in B decision trees in the random forest.

FIG. 9C depicts an example of a trained random forest 912 of B decision trees denoted by $T_b$, where b=1, . . . , B. The leaf nodes of each decision tree correspond to successful sales metric values. For each trending-product pair obtained in FIG. 9B, each of the decision trees in the random forest 912 is traversed with the same attributes of a trending-product pair to obtain a metric value from each of the decision trees. The metric value output from each decision tree $T_b$ is denoted by $R_b$. The metric values of the B decision trees are collected to form the set of metric values $$\{R_b\}_{b=1}^{B}.$$

After traversal of the B decision trees with attributes of a trending-product pairs, the metric values are averaged to obtain a predicted successful sales metric value for the trending-product pair as follows:

$$MV = \frac{1}{B}\sum_{b=1}^{B} R_b \tag{2}$$

The predicted successful sales metric value can compared with a promotion threshold (i.e., $MV > Th_{prom}$) to determine whether or not to promote the trending-product pair on a social media platform. For example, in FIG. 9C, each of the B decision trees are traversed by attributes of the trending-product pair Att($TC_i$, $PD_y$) 914. The resulting metric values are averaged according to Equation (2) to obtain a predicted successful sales metric value MV ($TC_i$, $PD_y$) 916. If MV($TC_i$, $PD_y$)>$Th_{prom}$ the product can be promoted on a social media platform. On the other hand, if MV($TC_i$, $PD_y$)<$Th_{prom}$ then the product should not be promoted on a social media platform.

Returning to FIG. 5, in block 510, a user engagement model can be used to predict potential user engagement with each of the trending-product pairs identified in block 508. The user engagement model can be a regression model, such as a linear regression model, a polynomial regression model, a ridge regression model, or a LASSO regression model, or a neural network that has been trained from past marketing campaign data, trending content, and product sales data for similar trending content and product combinations. The user engagement model receives as input the trending content vector and product vector of a trending-product pair obtained in block 508 and outputs a prediction of success of increased sales for the trending-product pair. The prediction of success can be a numerical value that corresponds to the number of expected sales or a value that indicates the probability of success. If the predicted success is greater than a predicted success threshold, $Th_{suc}$, the trending-product pair is identified has having a probability of success.

Figure 10:
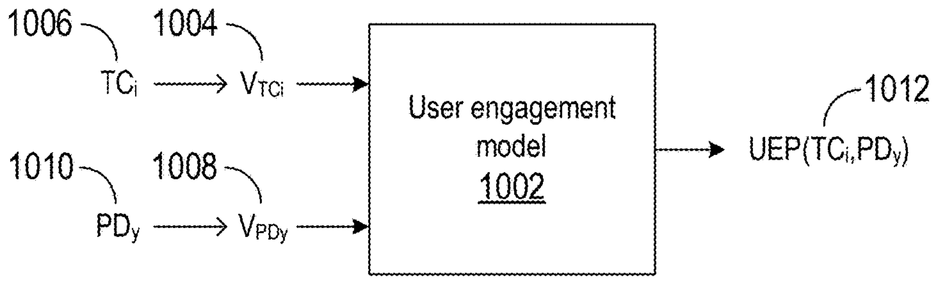
FIG. 10 depicts an example of using a user engagement model to predict success of a trending-product pair.

FIG. 10 depicts an example of using a user engagement model 1002 to predict the success of a trending-product pair ($TC_i$, $PD_y$). The trending content vector $V_{TCi}$ 1004 of the trending content $TC_i$ 1006 and the product vector $V_{PDy}$ 1008 of the product $PD_y$ 1010 are input to the user engagement model 1002. The user engagement model 1002 outputs a user predicted success value denoted by UEP ($TC_i$, $PD_y$) 1012. If the UEP ($TC_i$, $PD_y$)>$Th_{suc}$, the corresponding trending-product pair ($TC_i$, $PD_y$) is identified as a success and is stored in a database and the process returns to block 308 in FIG. 3. On the other hand, if the UEP ($TC_i$, $PD_y$) ≤$Th_{suc}$, the corresponding trending-product pair ($TC_i$, $PD_y$) is identified as a failure and can be discarded from memory.

Returning to FIG. 3, in block 308, captions, hashtags, and promotional images that are personalized to each customer on different social media platforms are generated using a generative AI model. Personalized prompts are created for the trending-product pairs that are regarded as successful in block 510 of FIG. 5. Each prompt is in the form of a template with fields or blank spaces that are filled in with information about a customer to create a personalized prompt associated with the customer. The prompt template may include fields for entering information that identifies the social media platform used by the customer and the fields for entering information about the trending-product pair. The generative AI model receives as input the personalized prompt with information about the customer, information about the social medial platform, and information about the trending-product pair added. Each personalized prompt is input to the generative AI model, which has been trained to output one or more of a caption, hashtag, and promotional image of a product. The generative AI model is trained to ensure that the content of the captions, hashtags, and promotional images are personalized to each customer and relevant to the customer. For example, the generative AI model can be trained to generate different hashtags for different social media platforms based on the customer data scraped from each of the social media platforms.

Figure 11:
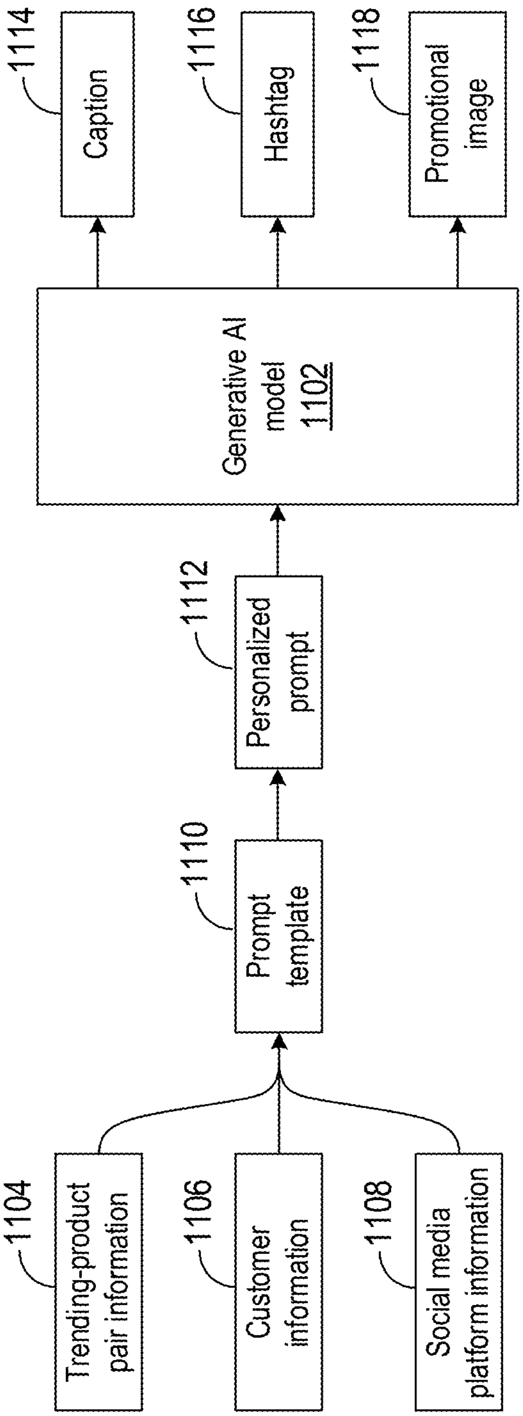
FIG. 11 depicts an example of a generative AI model used to generate a personalized prompt for increasing engagement with a customer.

FIG. 11 depicts an example of using a generative AI model 1102 to generate a caption, a hashtag, and a promotional image of a product that are personalized for increasing engagement with a customer. As show in FIG. 11, trending-product pair information 1104, customer information 1106, and social media platform information 1108 are used to fill in fields of a prompt template 1110 to create a personalize prompt 1112. The personalized prompt 1112 is input to the generative AI model 1102, which outputs a caption 1114, a hashtag 1116, and a promotional image of the product 1118. The caption 1114, the hashtag 1116, and the promotional image contain content that is personalized to the customer based on the customer information 1106. The captions, hashtags, and the promotional images that are personalized to each customer are stored in a database of a data storage device.

Figure 12:
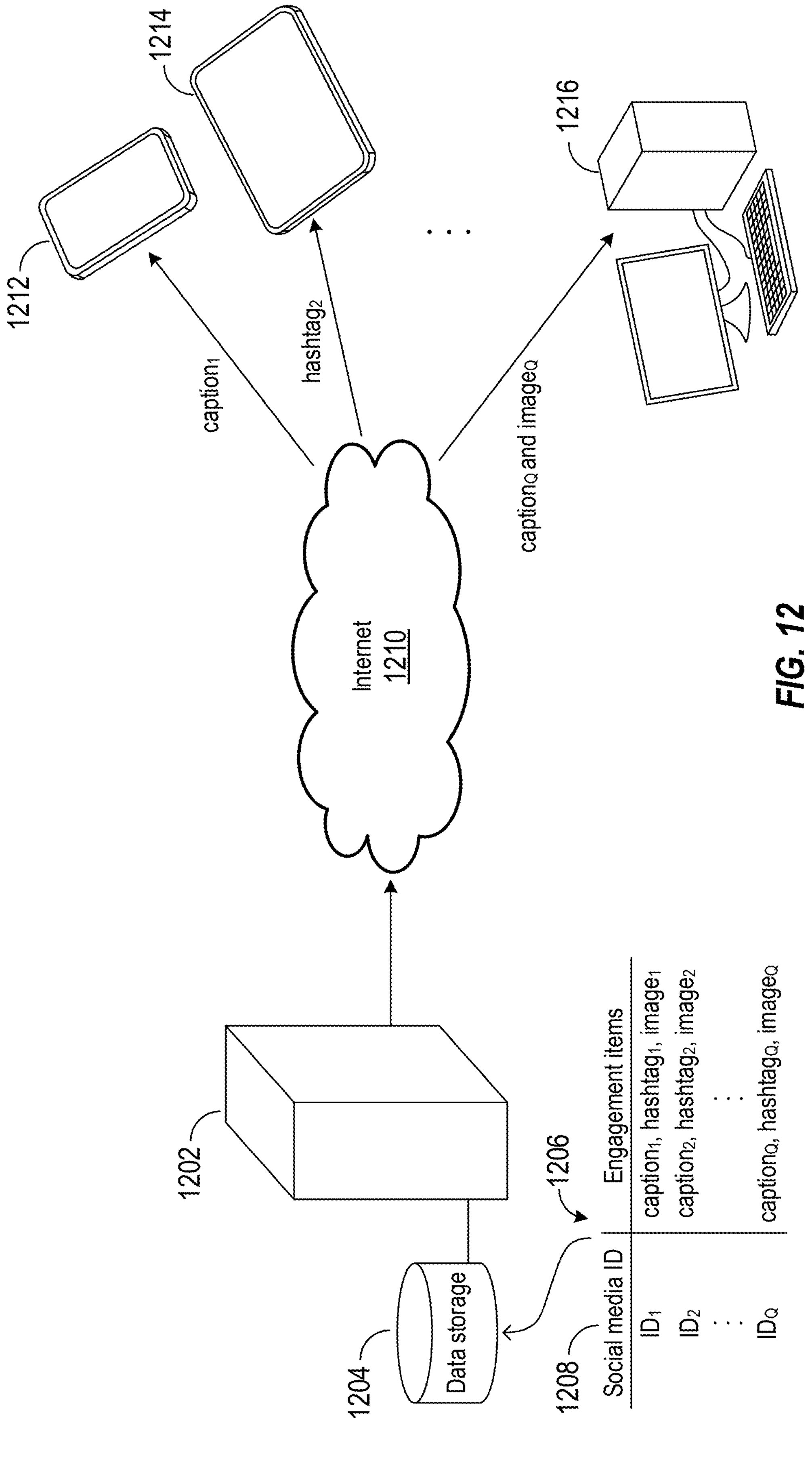
FIG. 12 depicts an example of a computer system that stores and sends personalized prompts to customers.

FIG. 12 depicts an example of a computer system 1202 that stores and sends the personalized captions, hashtags, and promotional images, obtained as described above with reference to FIGS. 1-11, to customers. The captions, hashtags, and promotional images that are personalized to each customer are stored in a data storage device 1204. Table 1206 records social media IDs and the captions, hashtags, and promotional images stored in the data storage device 1204 for Q customers, where Q is the number of customers. Column 1208 contains the social media identification of each customer, such as the social media IDs of the customers. The methods can include sending one or more of a caption, hashtag, or promotional image to the social media account of each customer over the internet 1210. For example, as shown in FIG. 12, a $caption_1$ created for engaging a first customer is sent to the social media account of the customer and displayed on a device 1212 of the customer; a personalized $hashtag_2$ created for engaging a second customer with a different product is sent to the social media account of the customer and displayed on a device 1214 of the customer; and a personalized $caption_Q$ and personalized $image_Q$ created for engaging a Q-th customer with a still different product is sent to the social media account of the customer and displayed on a device 1216 of the customer. Each caption, hashtag, and promotional image received on the social media platform may be configured with a link to launch a display of an advertisement of a product on the device of the customer via the social media platform.

Figure 13:
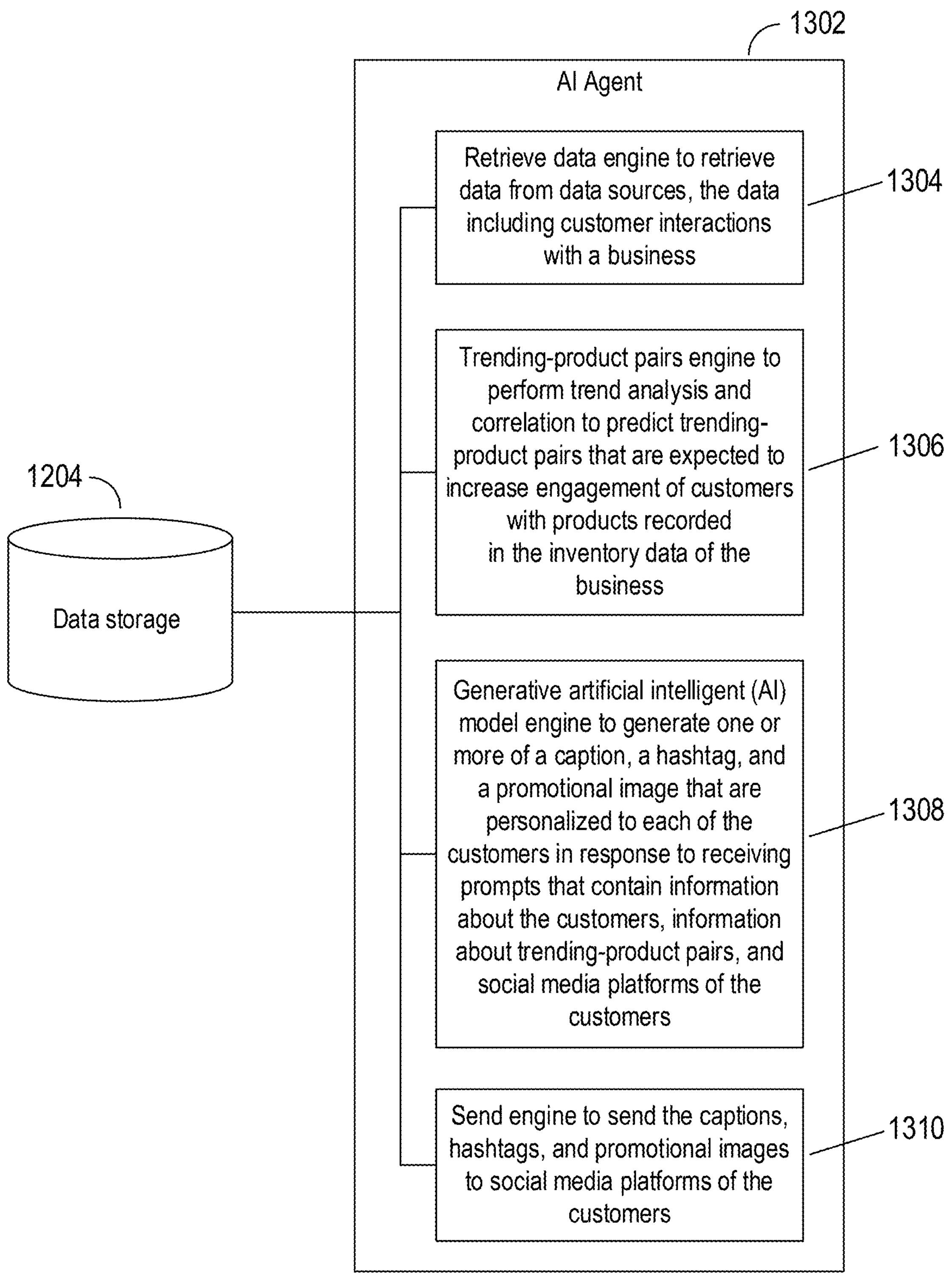
FIG. 13 depicts an example of an AI agent that performs an automated method for generating social media content and trend integration.

Example Implementation of an Artificial Intelligence Agent that Performs Automated Social Media Content Generation and Trend Integration FIG. 13 depicts an example of an AI agent 1302 that performs an automated method for generating social media content and trend integration as described above with references to FIGS. 1-12. The AI agent 1302 includes a retrieve data engine 1304 that retrieves data from data sources, the data including customer interactions with a business as described above with reference to FIG. 1. The AI agent 1302 includes a trending-products engine 1306 that performs trend analysis and correlation to predict trending-product pairs as described above with reference to FIGS. 8-9C. The AI agent 1302 includes a generative AI model engine 1308 that outputs personalized captions, hashtags, and promotional images to increase customer engagement with a product based on the trending-product pairs as described above with reference to FIG. 11. The AI agent 1302 includes a send engine 1310 that sends the captions, the hashtags, and the promotional images to social media platforms of the customers as described above with reference to FIG. 12.

Example Processing Methods for Evaluating Social Media Marketing Campaigns

Figure 14:
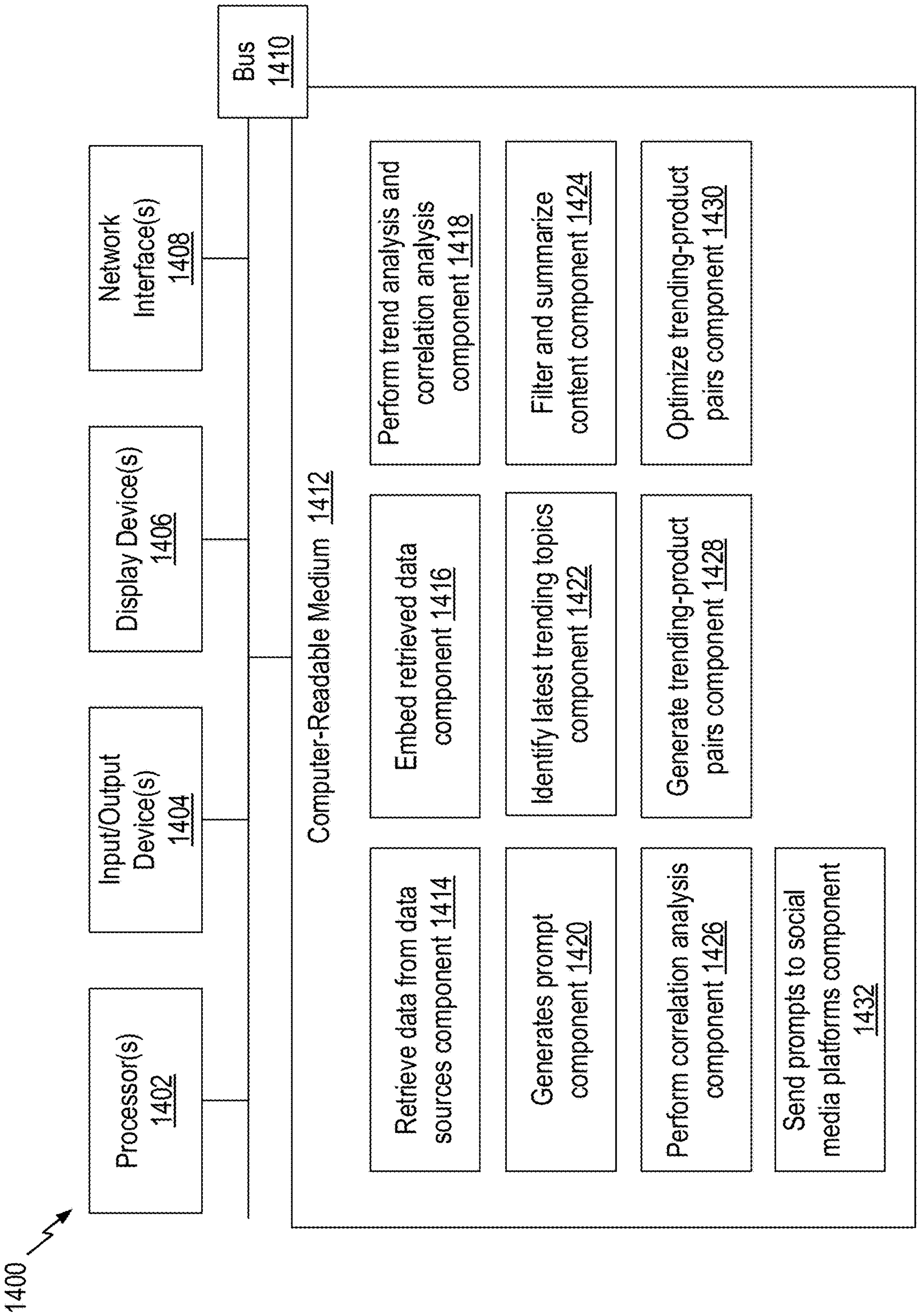
FIG. 14 depicts an example processing system with which aspects of the present disclosure can be performed.

FIG. 14 depicts an example processing system 1400 configured to perform various aspects described herein, including, for example, methods as described above with respect to FIGS. 1-12.

Processing system 1400 is an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 1400 includes one or more processors 1402, one or more input/output devices 1404, one or more display devices 1406, one or more network interfaces 1408 through which processing system 1400 is connected to one or more networks (e.g., a local network, an intranet, the Internet, or any other group of processing systems communicatively connected to each other), and computer-readable medium 1412. In the depicted example, the aforementioned components are coupled by a bus 1410, which may generally be configured for data exchange amongst the components. Bus 1410 may be representative of multiple buses, while only one is depicted for simplicity.

Processor(s) 1402 are generally configured to retrieve and execute instructions stored in one or more memories, including local memories like computer-readable medium 1412, as well as remote memories and data stores. Similarly, processor(s) 1402 are configured to store application data residing in local memories like the computer-readable medium 1412, as well as remote memories and data stores. More generally, bus 1410 is configured to transmit programming instructions and application data among the processor(s) 1402, display device(s) 1406, network interface(s) 1408, and/or computer-readable medium 1412. In certain embodiments, processor(s) 1402 are representative of a one or more central processing units (CPUs), graphics processing unit (GPUs), tensor processing unit (TPUs), accelerators, and other processing devices.

Input/output device(s) 1404 may include any device, mechanism, system, interactive display, and/or various other hardware and software components for communicating information between processing system 1400 and a user of processing system 1400. For example, input/output device(s) 1404 may include input hardware, such as a keyboard, touch screen, button, microphone, speaker, and/or other device for receiving inputs from the user and sending outputs to the user.

Display device(s) 1406 may generally include any sort of device configured to display data, information, graphics, user interface elements, and the like to a user. For example, display device(s) 1406 may include internal and external displays such as an internal display of a tablet computer or an external display for a server computer or a projector. Display device(s) 1406 may further include displays for devices, such as augmented, virtual, and/or extended reality devices. In various embodiments, display device(s) 1416 may be configured to display a graphical user interface.

Network interface(s) 1408 provide processing system 1400 with access to external networks and thereby to external processing systems. Network interface(s) 1408 can generally be any hardware and/or software capable of transmitting and/or receiving data via a wired or wireless network connection. Accordingly, network interface(s) 1408 can include a communication transceiver for sending and/or receiving any wired and/or wireless communication.

Computer-readable medium 1412 may be a volatile memory, such as a random access memory (RAM), or a nonvolatile memory, such as nonvolatile random access memory (NVRAM), or the like. In this example, computer-readable medium 1412 includes a retrieve data from data source component 1414, an embed retrieved data component 1416, a preform trend analysis and correlation analysis component 1418, and a generate a prompt component 1420.

In certain embodiments, the retrieve data from data sources component 1414 is configured to perform the operations described above with reference to block 302 in FIG. 3.

In certain embodiments, the embed retrieved data component 1416 is configured to perform the operations described above with reference to block 304 in FIG. 3.

In certain embodiments, the preform trend analysis and correlation analysis component 1418 is configured to perform the operations described above with reference to block 306 in FIG. 3.

In certain embodiments, the generate a prompt component 1420 is configured to perform the operations described above with reference to block 308 in FIG. 3.

In certain embodiments, the identify latest trending topics component 1422 is configured to perform the operations described above with reference to block 502 in FIG. 5.

In certain embodiments, the filter and summary component 1424 is configured to perform the operations described above with reference to block 504 in FIG. 5.

In certain embodiments, the perform correlation analysis component 1426 is configured to perform the operations described above with reference to block 506 in FIG. 5.

In certain embodiments, the generate trending-product pairs component 1428 is configured to perform the operations described above with reference to block 508 in FIG. 5.

In certain embodiments, the optimize the trending-product pairs component 1430 is configured to perform the operations described above with reference to block 510 in FIG. 5.

In certain embodiments, the send prompts to social media platforms component 1432 is configured to perform the operations described above with reference to FIG. 12.

Note that FIG. 14 is just one example of a processing system consistent with aspects described herein, and other processing systems having additional, alternative, or fewer components are possible consistent with this disclosure.

EXAMPLE CLAUSES

Implementation examples are described in the following numbered clauses:

Clause 1: A computer-implemented method, comprising: retrieving data from data sources, the data including customer interactions with a business, a profile of the business, inventory data of the business, sales data of the business, and social media websites of customers of the business; determining trending-product pairs that increase engagement of the customers with products recorded in the inventory data of the business based on the retrieved data; using a generative artificial intelligence (AI) model to output prompts based on the trending-product pairs, each prompt output from the generative AI model includes one or more of a caption, a hashtag, and a promotional image that is personalized to a customer; and sending the prompts to social media platforms of the customers, wherein each prompt is configured such that when launched via the social media platform one or more of a caption, a hashtag, and a promotional image that is personalized to the customer is displayed.

Clause 2: The method of Clause 1, wherein retrieving the data from the data sources comprises executing a social media application programming interface (API) to retrieve data from social media websites of the customers.

Clause 3: The method of any one of Clauses 1-2, wherein retrieving the data from the data sources comprises executing website scraper to scrape publically available data from the social media websites of the customers.

Clause 4: The method of any one of Clauses 1-3, further comprising: using an embedding model to embed the data in a user vector; and storing the user vector in a vector database.

Clause 5: The method of any one of Clauses 1-4, wherein determining the trending-product pairs comprises: scraping trending content from one or more trending topics, hashtags, and popular posts from the social media websites using APIs and website scraping; using an embedding model to embed trending content into vectors; and using clustering to identify clusters of the vectors, each cluster corresponding to a different trending content.

Clause 6: The method of any one of Clauses 1-5, wherein determining the trending-product pairs comprises: using a natural language processing (NLP) model and a classification model to extract context and sentiment from content of the social media websites; and summarizing the extracted context and sentiment using at least one of extractive and abstractive summarization techniques.

Clause 7: The method of any one of Clauses 1-6, wherein determining the trending-product pairs comprises: embedding trending topics recorded in the social media websites into corresponding trending content vectors that form a set of trending content vectors; embedding products recorded in the inventory data into corresponding product vectors that form a set of product vectors; for each respective trending content vector in the set of trending content vectors: for each respective content vector in the set of product vectors; computing a cosine similarity between the respective trending content vector and the respective product vector, wherein the cosine similarity is a measure of the degree of similarity between trending content associated with the respective trending content vector and a product associated with the respective product vector; for each respective trending content, rank ordering the products according to cosine similarities between the respective tending content and the products; and forming trending-product pairs from trending topics and products with largest cosine similarities.

Clause 10: The method of any of Clauses 1-9, wherein determining the trending-product pairs comprises: using a regression model to generate a value that predicts potential user engagement for each trending-product pair; and identifying the trending-product pairs that increase user engagement based on largest values of the predicted potential user engagement Clause 11: A processing system, comprising: a memory comprising computer-executable instructions; and a processor configured to execute the computer-executable instructions and cause the processing system to perform a method in accordance with any one of Clauses 1-10.

Clause 12: A computer-implemented AI agent, comprising retrieve data engine that retrieves data from data sources, the data including customer interactions with a business, a profile of the business, inventory data of the business, sales data of the business, and social media websites of customers of the business; trending-product pairs engine that generate trending-product pairs designed to increase engagement of the customers with products recorded in the inventory data of the business based on the retrieved data; generative artificial intelligence (AI) model that outputs prompts based on the trending-product pairs, each prompt output from the generative AI model includes one or more of a caption, a hashtag, and a promotional image that is personalized to a customer; and send prompts engine that sends the prompts to social media platforms of the customers, wherein each prompt is configured such that when launched via the social media platform one or more of a caption, a hashtag, and a promotional image that is personalized to the customer is displayed.

Clause 13: The AI agent of Clause 12, wherein the trending-product pairs engine comprises: application programming interfaces that retrieve trending topics, hashtags, and posts from the social media websites; an embedding model that embeds content of the trending content into vectors; and a clustering engine that identifies clusters of the vectors, each cluster corresponding to a different trending topic.

Clause 14: The AI agent of any one of Clauses 12-13, wherein the trending-product pairs engine comprises: a natural language processing (NLP) model and a classification model that extract context and sentiment from content of the social media websites; and a transformer model that summarizes the extracted context and sentiment using extractive and abstractive summarization techniques.

Clause 15: The AI agent of any one of Clauses 12-14, wherein the trending-product pairs engine performs operations comprising: embedding engine that embeds trending content recorded in the social media websites into corresponding trending content vectors; embedding products recorded in the inventory data into corresponding product vectors; for each trending content vector, for each product vector, computing a cosine similarity between the trending content vector and the product vector, each cosine similarity is a measure of the degree of similarity between trending content and a product; for each trending content, rank ordering the products according to value of the cosine similarity between tending content and a product; and forming trending-product pairs from trending topics and products with largest cosine similarities.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method, comprising:

retrieving, via an application programming interface (APD), content from a social media platform, the content comprising text data:

identifying a trend within the content using an unsupervised machine learning method, the trend comprising trend text data;

generating a trend embedding by providing the trend text data to a first embedding model, the trend embedding comprising an n-dimensional trend vector;

retrieving a first product text description comprising first product inventory data, and a second product text description comprising second product inventory data from a data lake;

generating a first product embedding based on the first product text description by providing the first product text description to a second embedding model, the first product embedding consisting of an n-dimensional first product vector;

forming a first trend-product pair comprising the trend embedding and the first product embedding;

generating a second product embedding based on the second product text description by providing the second product text description to the second embedding model, the second product embedding consisting of an n-dimensional second product vector;

forming a second trend-product pair comprising the trend embedding and the second product embedding;

training a user engagement model on one or more previously generated trend-product pairs to estimate a probability of success comprising a number of increased sales associated with a trend-product pair;

estimating, with the trained user engagement model, the probability of success associated with each of the first trend-product pair and the second trend-product pair;

calculating a first cosine similarity of the trend embedding and the first product embedding;

calculating a second cosine similarity of the trend embedding and the second product embedding;

determining that the first cosine similarity is greater than the second cosine similarity;

generating marketing content by providing the first trend-product pair to a generative artificial intelligence model, the marketing content comprising at least one of a caption, a hashtag, or a promotional image; and sending one or more of the captions, the hashtag, or the promotional image to a social media platform.

2. The computer-implemented method of claim 1, wherein identifying the trend comprises executing a social media application programming interface (API) to retrieve data from social media websites of customers.

3. The computer-implemented method of claim 1, wherein identifying the trend comprises executing a website scraper to scrape publicly available data from the social media platform.

4. The computer-implemented method of claim 1, wherein one or more of a caption, a hashtag, or a promotional image is received on the social media platform of a customer and is configured such that when launched via the social media platform an advertisement of a product identified by the first product text description is displayed.

5. The computer-implemented method of claim 1, wherein identifying the trending comprises using clustering to identify clusters of trend n-dimensional vectors, each cluster corresponding to a different trending content.

6. The computer-implemented method of claim 1, wherein identifying a trend comprises:

using a natural language processing (NLP) model and a classification model to extract context and sentiment text data from content of the social media platform; and summarizing the extracted context and sentiment text data using at least one of extractive and abstractive summarization techniques.

7. The computer-implemented method of claim 1, wherein determining the first trend-product pair and second trend-product pair comprises:

embedding trending topics recorded in the social media platform into a set of trend n-dimensional vectors;

embedding the first product text description and the second product text description in the first product inventory data and second product inventory data into corresponding first product n-dimensional vector and second product n-dimensional vector that form a set of product n-dimensional vectors;

for each respective trend n-dimensional vector in the set of trend n-dimensional vectors:

for each respective product n-dimensional vector in the set of product n-dimensional vectors:

computing a cosine similarity between the respective trend n-dimensional vector and the respective product n-dimensional vector, wherein the cosine similarity is a measure of a degree of similarity between trending content associated with the respective trend n-dimensional vector and a product associated with the respective product n-dimensional vector;

for each respective trend n-dimensional vector, rank ordering the set of product n-dimensional vectors according to cosine similarities between the respective trend n-dimensional vector and the each respective product n-dimensional vector; and forming trend-product pairs from the trend n-dimensional vectors and respective ones from the set of product n-dimensional vectors with largest cosine similarities.

8. The computer-implemented method of claim 1, wherein determining the first trend-product pair and second trend-product pair comprises:

using a regression model to generate a value that predicts potential user engagement for each trend-product pair; and identifying the trend-product pairs that increase user engagement based on largest values of the predicted potential user engagement.

9. A processing system, comprising:

one or more memories comprising computer-executable instructions; and one or more processors configured to execute the computer-executable instructions and cause the processing system to:

retrieve, via an application programming interface (API), content from a social media platform, the content comprising text data;

identify a trend within the content using an unsupervised machine learning method, the trend comprising trend text data;

generate a trend embedding by providing the trend text data to a first embedding model, the trend embedding comprising an n-dimensional trend vector;

retrieve a first product text description comprising first product inventory data, and a second product text description comprising second product inventory data from a data lake;

generate a first product embedding based on the first product text description by providing the first product text description to a second embedding model, the first product embedding consisting of an n-dimensional first product vector;

form a first trend-product pair comprising the trend embedding and the first product embedding;

generate a second product embedding based on the second product text description by providing the second product text description to the second embedding model, the second product embedding consisting of an n-dimensional second product vector;

form a second trend-product pair comprising the trend embedding and the second product embedding;

train a user engagement model on one or more previously generated trend-product pairs to estimate a probability of success comprising a number of increased sales associated with a trend-product pair;

estimate, with the trained user engagement model, the probability of success associated with each of the first trend-product pair and the second trend-product pair;

calculate a first cosine similarity of the trend embedding and the first product embedding;

calculate a second cosine similarity of the trend embedding and the second product embedding;

determine that the first cosine similarity is greater than the second cosine similarity:

generate marketing content by providing the first trend-product pair to a generative artificial intelligence model, the marketing content comprising at least one of a caption, a hashtag, or a promotional image; and send one or more of the caption, the hashtag, and the promotional image to a social media platform.

10. The processing system of claim 9, wherein identify the trend comprises executing a web scraping application programming interface (API) to scrape data from social media websites of customers.

11. The processing system of claim 9, wherein identify the trend comprises executing social media APIs that scrape publicly available data from the social media platform.

12. The processing system of claim 9, wherein one or more of a caption, a hashtag, or a promotional image is received on the social media platform of a customer is configured such that when launched via the social media platform an advertisement of a product identified by the first product text description is displayed.

13. The processing system of claim 9, wherein in order to identify the trend, the one or more processors are configured to execute the computer-executable instructions and further cause the processing system to use clustering to identify clusters of the trend n-dimensional vectors, each cluster of the clusters of trend n-dimensional vectors corresponding to a different trending content.

14. The processing system of claim 9, wherein identify the trend comprises:

use a natural language processing (NLP) model and a classification model to extract context and sentiment text data from content of the social media platform; and summarize the extracted context and sentiment text data using at least one of extractive and abstractive summarization techniques.

15. The processing system of claim 9, wherein determining the first trend-product pair and second trend-product pair comprises:

embed trending topics recorded in the social media websites-platform into a set of trend n-dimensional vectors;

embed the first product text description and the second product text description in the first product inventory data and second product inventory data into a corresponding first product n-dimensional vector and a second product n-dimensional vector that form a set of product n-dimensional vectors;

for each respective trend n-dimensional vector in the set of trend n-dimensional vectors:

for each respective product n-dimensional vector in the set of product n-dimensional vectors:

compute a cosine similarity between the respective trend n-dimensional vector and the respective product n-dimensional vector, wherein the cosine similarity is a measure of a degree of similarity between trending content associated with the respective trend n-dimensional vector and a product associated with the respective product n-dimensional vector;

for each respective trend n-dimensional vector, rank order the set of product n-dimensional vectors according to cosine similarities between the respective trend n-dimensional vector and each respective product n-dimensional vector; and form trending-product pairs from trending trend n-dimensional vectors and respective ones from the set of product n-dimensional vectors with largest cosine similarities.

16. The processing system of claim 9, wherein determining the first trend-product pair and second trend-product pair comprises:

use a regression model to generate a value that predicts potential user engagement for each trend-product pair; and identify the trend-product pairs that increase user engagement based on largest values of the predicted potential user engagement.

17. A computer-implemented artificial intelligence (AI) agent, comprising:

a retrieve engine configured to retrieve, via an application programming interface (API), content from a social media platform, the content comprising text data, a trend-product pair engine configured to:

identify a trend within the content using an unsupervised machine learning method, the trend comprising trend text data;

generate a trend embedding by providing the trend text data to a first embedding model, the trend embedding comprising a trend n-dimensional vector;

retrieve a first product text description comprising first product inventory data, and a second product text description comprising second product inventory data from a data lake:

generate a first product embedding based on the first product text description by providing the first product text description to a second embedding model, the first product embedding consisting of an n-dimensional first product vector;

form a first trend-product pair comprising the trend embedding and the first product embedding:

generate a second product embedding based on the second product text description by providing the second product text description to the second embedding model, the second product embedding consisting of an n-dimensional second product vector;

form a second trend-product pair comprising the trend embedding and the second product embedding;

train a user engagement model on one or more previously generated trend-product pairs to estimate a probability of success comprising a number of increased sales associated with a trend-product pair;

estimate, with the trained user engagement model, the probability of success associated with each of the first trend-product pair and the second trend-product pair;

calculate a first cosine similarity of the trend embedding and the first product embedding;

calculate a second cosine similarity of the trend embedding and the second product embedding;

determine that the first cosine similarity is greater than the second cosine similarity;

a generative artificial intelligence (AI) model engine configured to generate marketing content by providing the first trend-product pair to a generative artificial intelligence model, the marketing content comprising at least one of a caption, a hashtag, or a promotional image; and a send engine configured to send one or more of the captions, the hashtags, and the promotional image to a social media platform.

18. The AI agent of claim 17, wherein:

the second embedding model is configured to embed the content into trend n-dimensional vectors; and the trend-product pair engine comprises a clustering engine to identify clusters of the trend n-dimensional vectors, each cluster corresponding to a different trending topic.

19. The AI agent of claim 17, wherein the trending-product pair engine comprises:

a natural language processing (NLP) model and a classification model configured to extract context and sentiment from content of the social media platform; and a transformer model configured to summarize the extracted context and sentiment using extractive and abstractive summarization techniques.

* * * * *